United States Patent [19]

Rosso

[11] 4,109,526
[45] Aug. 29, 1978

[54] TURBINE METER FOR BI-DIRECTIONAL MEASUREMENT OF FLUID FLOW

[75] Inventor: John B. Rosso, Tulsa, Okla.

[73] Assignee: Combustion Engineering, Inc., Windsor, Conn.

[21] Appl. No.: 822,488

[22] Filed: Aug. 8, 1977

[51] Int. Cl.² .................. G01F 1/115; G01F 23/00
[52] U.S. Cl. .................. 73/231 R; 73/272 A; 73/290 R
[58] Field of Search .............. 73/229, 231 R, 231 M, 73/272 A, 291, 290 R, 198; 364/510

[56] References Cited

U.S. PATENT DOCUMENTS

| | | | |
|---|---|---|---|
| 2,671,174 | 3/1954 | Burgholtz | 73/231 R |
| 3,605,729 | 9/1971 | Liu et al. | 73/229 X |
| 3,680,378 | 8/1972 | Aurilio et al. | 73/231 R |

*Primary Examiner*—James J. Gill
*Attorney, Agent, or Firm*—Arthur L. Wade

[57] ABSTRACT

A multi-bladed turbine meter is in a fluid flow line and has two magnetic pick-ups at the periphery of its blade tips positioned to be pulsed at different times by each blade as each blade passes the pick-ups. A circuit is connected to both pick-ups to determine which pick-up is pulsed first and to register the volume of fluid which is passed through the meter in each direction.

5 Claims, 2 Drawing Figures

TURBINE METER FOR BI-DIRECTIONAL MEASUREMENT OF FLUID FLOW

BACKGROUND OF THE INVENTION

Turbine meters are steadily improving. These basically simple, multi-bladed, measuring devices have steadily gained in acceptance by industry.

Turbine meters have been used to measure fluid as it fills a reservoir a predetermined amount. Turbine meters have been used to measure fluid as the fluid is withdrawn from the reservoir inventory. To the non-inventive mind, a meter is required to measure the fluid flow in each direction of the same path. Economics demand only one meter be used for measuring the fluid flow in both directions of a single flow path. Further, convenience and time demand the bi-directional flow be differentially measured, i.e. the single registration of volume be that of the inventory of the reservoir. These demands must be met by invention over the prior art.

Next, consider closely the meter mechanism which must be used in solving the problem. A multi-bladed rotor has its shaft parallel with the fluid flow. The blades radiate from the shaft and are at an angle to the flow to develop a force which rotates the blades and shaft.

Electro-magnetic pick-up units are positioned about the periphery of the blades. The magnetic lines of force generated by these pick-up units are cut by each rotating blade to generate an electrical pulse. The number of pulses generated within a predetermined time span establishes the rate of fluid flow through the meter.

The prior art provides a single well in the meter casing in which a single pick-up unit is mounted. Can the single, conventional pick-up well be utilized to mount more than one pick-up unit as needed to provide signals which will establish the one of two directions fluid flows through the meter? Can a plurality of pick-up units be mounted at the periphery of the blades to establish which direction fluid flows through the meter and add or subtract from a single registration to manifest the inventory supplied through the meter? These two questions underline the problems solved by the present invention.

SUMMARY OF THE INVENTION

The present invention contemplates aligning two magnetic pick-up units at the periphery of turbine meter blades. Each blade of the meter is directed to rotate and slice the line of the two units at an angle. The arrangement insures that one of the pick-up units is actuated before the other. Which pick-up is actuated first depends upon which direction the fluid flows through the meter. In either direction of rotation, the pick-up units are nested in the same well of the meter body and are actuated in sequence by each blade of the turbine. The circuit receiving these pulses is arranged to detect in which of the two directions flow occurs and to manifest the quantity of fluid flowing in that direction.

Other objects, advantages and features of the invention will become apparent to those skilled in this art as the description, appended claims and drawings are considered.

DESCRIPTION OF THE PREFERRED EMBODIMENT

Figure 1:
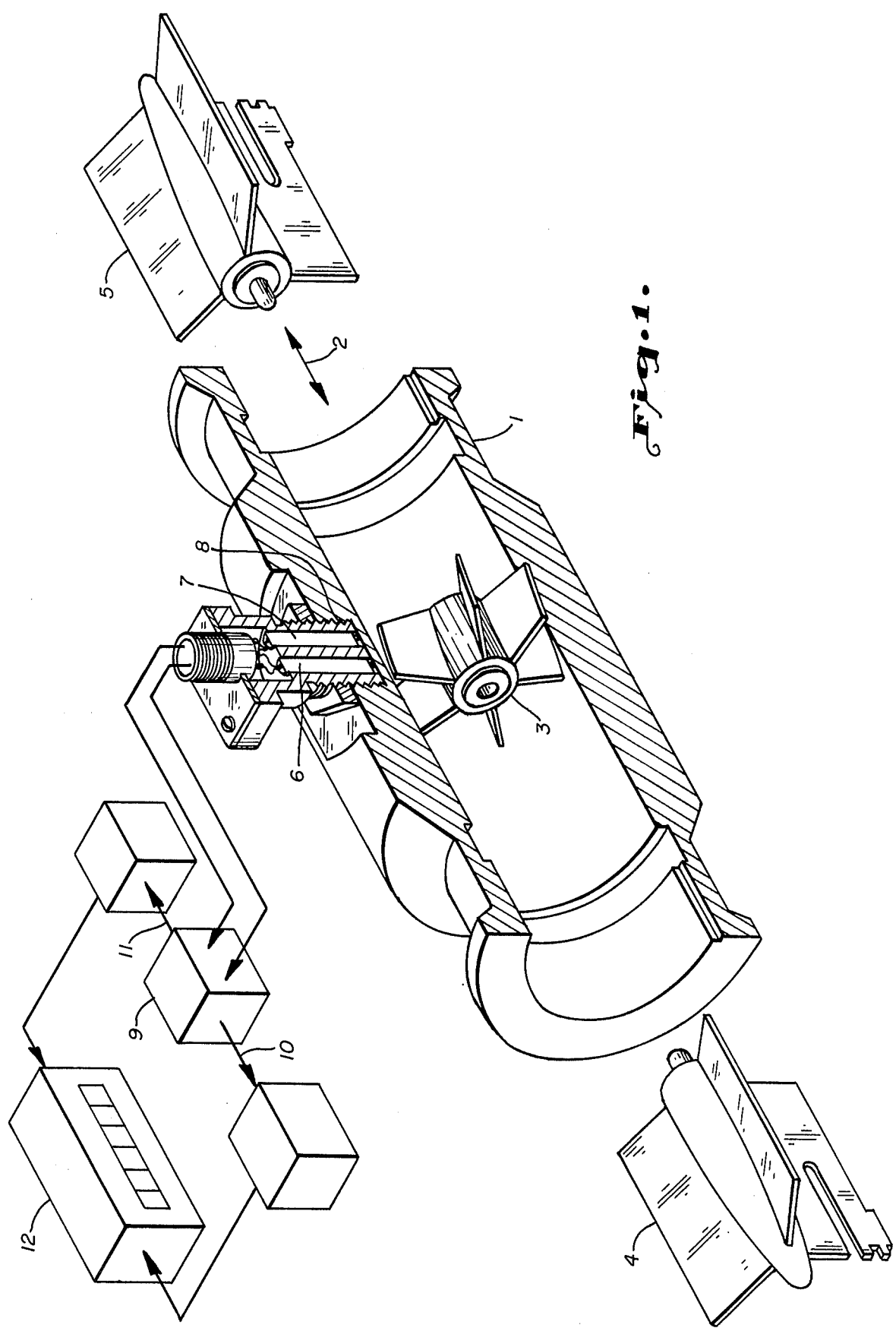
FIG. 1 is a sectional and exploded elevation in perspective of a turbine meter and responsive circuit in which the present invention is embodied.

Structuring definitions of the inventive concepts in the disclosure is difficult to couch in robust language within this particular art. As novel as the concepts are, they are embodied in structure which must be described in limited and simplistic terms such as meter body, turbine blades, pick-up units, fluid flow path, and manifestation of direction and quantity. This is hardly a dramatic arsenal from which to select telling descriptions that will ring out the solid advances this invention makes in the art. However, if words with a persuasive bite are unavailable, the words and phrases selected will be clear and definite as the periphery of the scope of the present invention is carefully traced in the following description of the drawing.

In FIG. 1 a conduit 1 defines the path along which fluids flow into and out of a reservoir which need not be shown. Flow arrow 2 is double-headed to establish that the flow of fluids through the conduit 1 can be in either of the two directions.

A more or less conventional, multi-bladed rotor 3 is disclosed as positioned in conduit 1 for the fluids to contact as a primary element. Spider supports 4 and 5 are in exploded positions relative to the shaft of rotor 3. The spider supports are moved to these exploded positions to avoid a clutter of such auxiliary structure about the rotor 3.

It is well established that a magnetic pick-up unit is conventionally mounted at the periphery of the tips of the blades of rotor 3. The pick-up establishes magnetic lines of force which are cut by each rotating blade of rotor 3. As each blade cuts the magnetic lines of force, the pick-up generates an output pulse.

The blades of rotor 3 rotate in a plane which is normal to the fluid flow path. Further, each blade is shaped, and positioned on the hub of rotor 3, so that its cross-section is at an angle to the plane or rotation. Each blade cross-section is also at an angle to the axis of hub rotation. Therefore, the impact of fluid flowing along the conduit 1 exerts force on the face of the blades with a vector which rotates the blades and their rotor 3. This structure and function is elementary to one skilled in the art, but it is reviewed to emphasize the angle at which the blades slice the magnetic field of the pick-up unit. It is this angle which the present invention utilizes in producing its new result.

The present invention is embodied in two magnetic pick-up units mounted at the periphery of the blade tips of rotor 3 so that each blade will cause the pick-up units to generate output pulses in sequence. A crude description of the relationship between pick-up units and blade is that one unit is pulsed before the other. With the alignment of the pick-up units and the blade angle known, the direction of rotor rotation will be known when the sequence in which the pick-up units are actuated is detected.

Now pick-up units 6 and 7 are aligned in the direction which will give a definite time between their actuations, or pulsing, by each blade. They could be arranged in the plane of rotor 3 rotation. However, aligning the units with the axis of rotor 3 brings them closer to the blade tips and generates stronger pulses.

However the units 6 and 7 are aligned, it is important that they do not require variations in the dimensions of single well, or bore, 8. Units 6 and 7 are sized to fit into the cavity, or well, already provided for a single pick-up unit. Thus, no change is required in this standard mounting provision.

The remaining problem is provision of a circuit which will respond, as desired, to the output pulses generated by 6 and 7. In general, electronic gates are readily designed to connect to both pick-up units and receive their trains of pulses. Further, a sensing circuit responds to the two pulse trains and controls the gates to fix the sequence in which the gates will pass the pulses. Two outputs will then be estabished from the gates. One of the outputs will be a train of pulses representative of the pulses generated by one of the pick-up units when the flow is in a first direction through the conduit 1. The other of the outputs will be a second train of pulses representative of the pulses generated by the second of the pick-up units when the flow is in the second direction through the conduit. Each of the pulse trains can alternately actuate a counter or each train can actuate a separate counter.

In FIG. 1, the gates, and phase sensing circuit is represented as embodied in 9. The separate pulse trains alternately flow outward as indicated by arrows 10 and 11. Both pulse trains are indicated as actuating the single counter 12.

ELECTRICAL CIRCUIT

Figure 2:
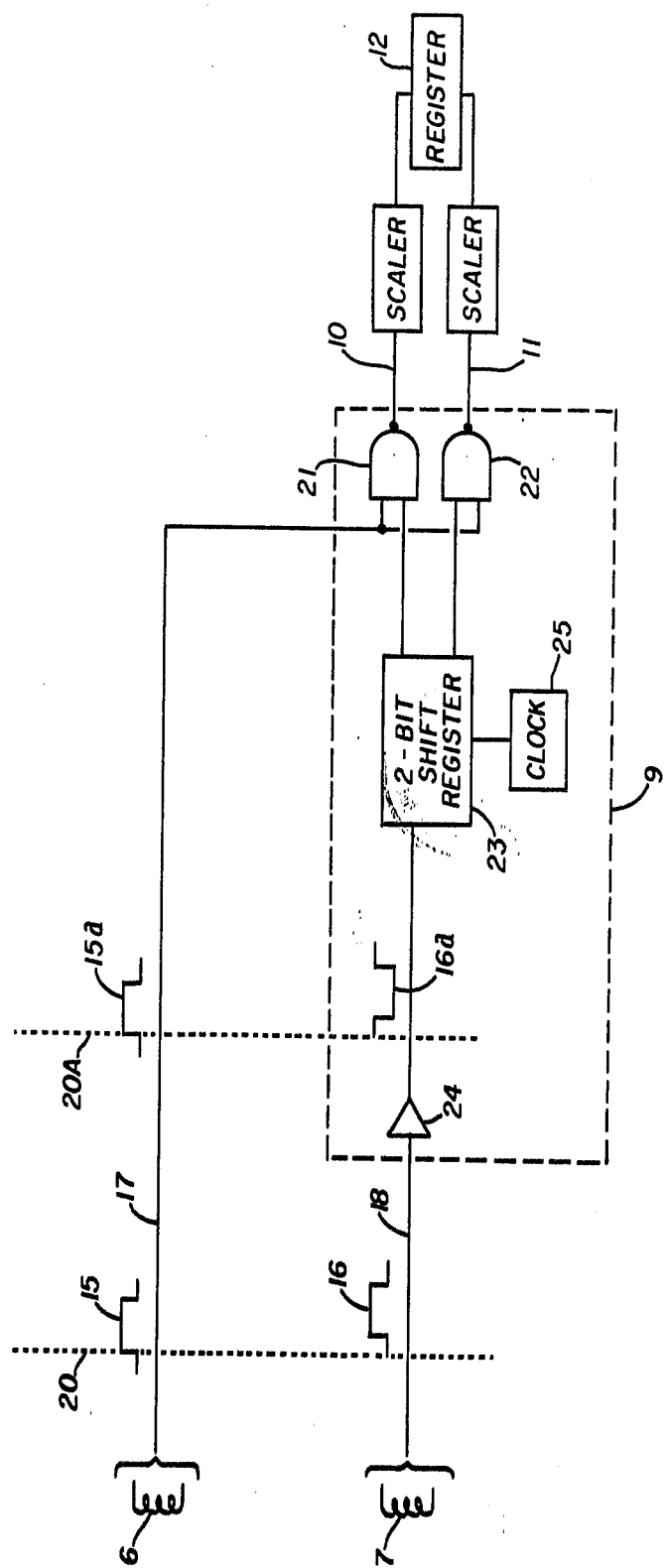
FIG. 2 is a schemmatic of the FIG. 1 circuit.

In FIG. 2, the relation between the pick-up units 6 and 7, the elements of the lead/lag phase sensing and gates of 9 and the scalers and register 12 are shown in more detail to insure the disclosure is complete. In FIG. 2 the pick-up units are represented by small coils at 6 and 7. The connections and electronic units which are required in a workable system have been abbreviated. However, enough is disclosed to make the operation understandable to one skilled in this art.

Imagination is depended upon to coordinate how coils 6 and 7 of FIG. 2 operate with the blades of rotor 3. The final result of each blade cutting the lines of magnetic force of the coils 6 and 7 is the generation of pulses of voltage. One pulse is generated a finite time before the other pulse.

There is much electronic gear to shape and size the pulses 15 and 16. However, the pulses are represented just above lines 17 and 18 in more or less their final, processed form. They are abruptly generated, of uniform and consistent magnitude and terminated abruptly. They may be termed "square wave" pulses. A time, base line, 20 is vertically drawn to give positive emphasis that one pulse is generated before the other.

Those skilled in the art are familiar with the basic circuit arrangement. Electronic gates 21, 22 are disclosed within circuit 9. Line 17 routes the pulses, represented by pulse 15, directly from pick-up coil 6 to one of the two inputs of each of gates 21 and 22. Meanwhile, the pulses, represented by pulse 16, from pick-up coil 7, are routed to the 2-bit shift register 23.

Pulse 16 is inverted by electronic unit 24. To be absolutely sure of being understood, pulse 15a and pulse 16a are disclosed in relation to time, base line 20a. Pulse 16a is inverted by unit 24 but is otherwise fixed in its relation to 15a.

The pulses represented by 16a are routed into 2-bit shift register 23. Oscillator, or clock 25 is connected to the register 23. The clock 25 scans the pulses routed to the register and passes them to the gates 21,22. As pulse 16a is inverted relative to pulse 15a, the read-out of register 23 by clock 25 will determine which of gates 21,22 the pulses will pass to the scaler which are connected to the gates by lines 10 and 11.

One scaler, or the other, will receive the pulse train from the gates 21,22. Which pulse leads the other pulse determines whether gate 10 or gate 11 will pass a pulse train to register 12. The lead/lag relation of the pulses will be established by the direction rotor 3 turns. The lead/lag of the pulses will determine which gate passes the pulse trains to register 12. The register 12 will be actuated in one direction by gate 10 pulses and in the other direction by gate 11 pulses. Therefore, the flow in one direction will add to the reading of register 12 and the flow in the other direction will subtract from the register 12 reading.

CONCLUSION

The disclosed system measures the flow of fluid in a path. The system determines which direction the fluid flows in the path and the quantity of fluid that flows in each direction. A turbine meter responds to the flow and two magnetic pick-up units are mounted so each blade will generate a pair of pulses with the two pick-up units. The two pulses will be generated at different times. The system will determine which pulse is generated first and therefore which direction the fluid flows. A pair of electronic gates is connected to both pick-up units. A sensing circuit inverts the pulses of one pick-up unit and uses a clock to read out these pulses from a 2-bit shift register to the electronic gates. This control thereby routes the pulse train of the pick-up units through the gate which is related to one of the two directions of flow. The alternate flow will be evidenced by the change in the lead/lag relation of the pulses and the read-out of inverted pulses will be routed through the second of the gates.

The end result is two different pulse trains to the same register. The one pulse train actuates the register in one direction, and the other pulse train actuates the register in the other direction.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A system measuring the flow of fluids in a single path in either of the two directions along the path, including,
   a turbine meter with a plurality of metallic blades rotating in a plane normal the path and each blade positioned to provide a cross-section at an angle to the plane of rotation,
   a first magnetic pick-up unit mounted at the periphery of the blade tips to generate a first output pulse as each blade tip cuts the magnetic lines of force established by the unit,
   a second magnetic pick-up unit mounted at the periphery of the blade tips and in an alignment with the first unit to form an angle with the blade cross-section, whereby the second magnetic pick-up unit generates a second output pulse at a time different than the generation of the first output pulse as each blade tip cuts the magnetic lines of force established by the second unit, electronic gates connected to the pick-ups to receive the train of pulses from both pick-ups, a sensing circuit connected to the pick-ups and gates to control which gate will pass the pick-up pulses, and a counter connected to the gates to accumulate the pulses in the manner dependent upon which direction the turbine meter blades rotate.

2. The system of claim 1 in which, each turbine blade is also positioned to provide a cross-section at an angle to the fluid flow path, and the two magnetic pick-up units are mounted at the periphery of the blade tips and in alignment parallel the fluid flow path.

3. The system of claim 1 in which, a conduit is provided in which the rotating blades are mounted and through which the fluids flow to rotate the blades, and the pick-up units are mounted in a single cavity of the conduit wall and at the periphery of the blade tips.

4. A read-out system for a turbine flow meter, including, a turbine meter with rotating metallic blades wherein each tip with an angled cross-section cuts the lines of magnetic fields established at their periphery, two magnetic pick-up units mounted at the periphery of the turbine meter blade tips establishing fields of magnetic lines of force in the arrangement wherein a first of the units is pulsed by each blade tip cutting the field of its lines of force before the second of the units is pulsed by the same blade tip cutting the field of its lines of force, electronic gates connected to the pick-up units to receive the train of pulses from each unit, a phase sensing circuit connected between the pick-up units and the gates and arranged to control the gate output of pulse trains representative of fluid flow in a predetermined direction through the meter, and a counter connected to the gates and arranged to manifest the pulse trains as a quantitative fluid flow through the turbine meter in dependence upon the predetermined direction of the fluid flow through the meter.

5. The system of claim 4 including, a conduit for the turbine meter in which the rotating blades are mounted, a cavity in the conduit in which the pick-up units are mounted at the periphery of the turbine meter blade tips, and the arrangement of pick-up units and blade tips is that the cross-section of the blade tips is at an angle to the plane of blade rotation and the axis of blade rotation and the units are aligned so the blade cross-section will cut the alignment of the units at an angle.

* * * * *